(12) United States Patent
Aizawa et al.

(10) Patent No.: US 12,165,422 B2
(45) Date of Patent: Dec. 10, 2024

(54) MOBILE OBJECT CONTROL DEVICE, MOBILE OBJECT CONTROL METHOD, AND STORAGE MEDIUM

(71) Applicant: HONDA MOTOR CO., LTD., Tokyo (JP)

(72) Inventors: Koki Aizawa, Wako (JP); Kosuke Nakanishi, Wako (JP); Takashi Matsumoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 192 days.

(21) Appl. No.: 18/070,625

(22) Filed: Nov. 29, 2022

(65) Prior Publication Data

US 2023/0177846 A1    Jun. 8, 2023

(30) Foreign Application Priority Data

Dec. 7, 2021  (JP) .................... 2021-198523

(51) Int. Cl.
*G06V 20/56* (2022.01)
*B60W 10/04* (2006.01)
(Continued)

(52) U.S. Cl.
CPC ........... *G06V 20/588* (2022.01); *B60W 10/04* (2013.01); *B60W 10/18* (2013.01); *B60W 10/20* (2013.01);
(Continued)

(58) Field of Classification Search
CPC ... G06V 20/588; G06V 10/764; B60W 10/04; B60W 10/18; B60W 10/20; B60W 30/12;
(Continued)

(56) References Cited

U.S. PATENT DOCUMENTS

2005/0228587 A1  10/2005  Kobayashi et al.
2015/0070501 A1   3/2015  Ooi
(Continued)

FOREIGN PATENT DOCUMENTS

DE  102019134320 A1 *  6/2021  ......... G06K 9/00798
JP     2005-301603        10/2005
(Continued)

OTHER PUBLICATIONS

Hillel et al.; Recent progress in road and lane detection: a survey; Machine Vision and Applications (2014) 25:727-745 (Year: 2014).*
(Continued)

*Primary Examiner* — Michael J Zanelli
(74) *Attorney, Agent, or Firm* — Amin, Turocy & Watson, LLP

(57) ABSTRACT

A mobile object control device of an embodiment includes a lane marking candidate recognizer configured to recognize candidates for a lane marking that demarcates a traveling lane in which a mobile object travels from an image including surroundings of the mobile object captured by an imaging unit, a virtual line setter configured to set at least one or more virtual lines outside of the lane marking recognized in the past as a lane marking that demarcates the traveling lane, when viewed from the mobile object, and a lane marking searcher configured to search for a lane marking that demarcates a current traveling lane of the mobile object on the basis of the lane marking candidates recognized by the lane marking candidate recognizer and the one or more virtual lines.

9 Claims, 6 Drawing Sheets

(51) Int. Cl.
*B60W 10/18* (2012.01)
*B60W 10/20* (2006.01)
*B60W 30/12* (2020.01)
*B60W 30/14* (2006.01)
*B60W 30/18* (2012.01)

(52) U.S. Cl.
CPC ............. *B60W 30/12* (2013.01); *B60W 30/14* (2013.01); *B60W 30/18163* (2013.01); *B60W 2420/403* (2013.01); *B60W 2552/53* (2020.02); *B60W 2720/10* (2013.01); *B60W 2720/24* (2013.01)

(58) Field of Classification Search
CPC ..... B60W 30/18163; B60W 2420/403; B60W 2552/53; B60W 2720/10; B60W 2720/24; B60W 40/02
See application file for complete search history.

(56) References Cited

U.S. PATENT DOCUMENTS

| | | | |
|---|---|---|---|
| 2016/0188984 A1 | 6/2016 | Kawano et al. | |
| 2018/0129887 A1* | 5/2018 | Kang | G06T 7/70 |
| 2019/0354779 A1* | 11/2019 | Zhao | G06V 20/588 |
| 2020/0298843 A1* | 9/2020 | Matsunaga | B60W 40/04 |
| 2024/0144701 A1* | 5/2024 | Saggu | G06V 20/588 |

FOREIGN PATENT DOCUMENTS

| | | | |
|---|---|---|---|
| JP | 2013-232079 | 11/2013 | |
| JP | 2014157469 A * | 8/2014 | |
| JP | 2016-122320 | 7/2016 | |
| JP | 2020-077126 | 5/2020 | |
| WO | WO-2017047365 A1 * | 3/2017 | ............. B60R 21/00 |
| WO | WO-2018123019 A1 * | 7/2018 | ............. B60R 21/00 |

OTHER PUBLICATIONS

Xuan et al.; Robust Lane-Mark Extraction for Autonomous Driving Under Complex Real Conditions; IEEE Access—Digital Object Identifier 10.1109/ACCESS.2017.2731804; Mar. 9, 2018; vol. 6, 2018, pp. 5749-5765 (Year: 2018).*

Aly, Mohamed; Real time Detection of Lane Markers in Urban Streets; 2008 IEEE Intelligent Vehicles Symposium Eindhoven University of Technology Eindhoven, The Netherlands, Jun. 4-6, 2008; pp. 7-12 (Year: 2008).*

Japanese Office Action for Japanese Patent Application No. 2021-198523 mailed Aug. 27, 2024.

* cited by examiner

MOBILE OBJECT CONTROL DEVICE, MOBILE OBJECT CONTROL METHOD, AND STORAGE MEDIUM

CROSS-REFERENCE TO RELATED APPLICATION

Priority is claimed on Japanese Patent Application No. 2021-198523, filed Dec. 7, 2021, the content of which is incorporated herein by reference.

BACKGROUND

Field of the Invention

The present invention relates to a mobile object control device, a mobile object control method, and a storage medium.

Description of Related Art

In recent years, research on automated driving in which traveling of a vehicle is automatically controlled has been carried out. In this regard, a technology for adjusting lane disposition on the basis of lanes around a vehicle as recognized by a sensor that detects the surrounding conditions of the vehicle and lanes around the vehicle acquired from map data on the basis of the position and posture of the vehicle is known (for example, Japanese Unexamined Patent Application, First Publication No. 2018-55414).

SUMMARY

However, due to instability in recognition by the sensor that detects the surrounding conditions of the vehicle, when a line with a shape similar to a lane marking is recognized near a lane marking during recognition, there has been a possibility of that line being erroneously recognized as a lane marking that demarcates a traveling lane of the vehicle.

Aspects of the present invention have been made in consideration of such circumstances, and one of the objects thereof is to provide a mobile object control device, a mobile object control method, and a storage medium that can more accurately recognize a lane marking that demarcates a traveling lane in which a host vehicle travels.

The mobile object control device, the mobile object control method, and the storage medium according to the present invention have adopted the following configuration.

(1): A mobile object control device according to one aspect of the present invention includes a lane marking candidate recognizer configured to recognize candidates for a lane marking that demarcates a traveling lane in which a mobile object travels from an image including surroundings of the mobile object captured by an imaging unit, a virtual line setter configured to set at least one or more virtual lines outside of the lane marking recognized in the past as a lane marking that demarcates the traveling lane, when viewed from the mobile object, and a lane marking searcher configured to search for a lane marking that demarcates a current traveling lane of the mobile object on the basis of the lane marking candidates recognized by the lane marking candidate recognizer and the one or more virtual lines.

(2): In the aspect of (1) described above, the virtual line setter sets the virtual line to a position where a road boundary including the current traveling lane of the mobile object is expected to be present.

(3): In the aspect of (1) described above, the virtual line setter sets a virtual line at a position that is a predetermined distance away from a lane marking recognized in the past as a lane marking that demarcates the traveling lane.

(4): In the aspect of (1) described above, the lane marking searcher determines, among the lane marking candidates, a lane marking candidate that is closest to the lane marking which demarcated the traveling lane in the past as a lane marking that demarcates a current traveling lane of the mobile object.

(5): In the aspect of (1) described above, the lane marking searcher does not determine, among the lane marking candidates, a lane marking candidate whose distance from the virtual line is within a predetermined distance as a lane marking that demarcates a current traveling lane of the mobile object.

(6): In the aspect of (1) described above, the lane marking searcher recognizes, among the lane marking candidates, a lane marking candidate whose distance from the virtual line is within a predetermined distance as a boundary line other than a lane marking that demarcates a current traveling lane of the mobile object.

(7): In the aspect of (1) described above, the mobile object control device further includes a driving controller configured to control one or both of speed and steering of the mobile object such that the mobile object travels along the lane marking that demarcates a traveling lane of the mobile object, which is determined by the lane marking searcher.

(8): A mobile object control method according to another aspect of the present invention is a mobile object control method that includes, by a computer of a mobile object control device, recognizing candidates for a lane marking that demarcates a traveling lane in which a mobile object travels from an image including surroundings of the mobile object captured by an imaging unit, setting at least one or more of virtual lines outside of a lane marking recognized in the past as a lane marking that demarcates the traveling lane, when viewed from the mobile object, and searching for a lane marking that demarcates a current traveling lane of the mobile object on the basis of the recognized lane marking candidates and the set one or more virtual lines.

(9): A storage medium according to still another aspect of the present invention is a computer-readable non-transitory storage medium that has stored a program causing a computer of a mobile object control device to execute recognizing candidates for a lane marking that demarcates a traveling lane in which a mobile object travels from an image including surroundings of the mobile object captured by an imaging unit, setting at least one or more of virtual lines outside of a lane marking recognized in the past as a lane marking that demarcates the traveling lane, when viewed from the mobile object, and searching for a lane marking that demarcates a current traveling lane of the mobile object on the basis of the recognized lane marking candidates and the set one or more virtual lines.

According to the aspects of (1) to (9) described above, it is possible to more accurately recognize a lane marking that demarcates a traveling lane in which a host vehicle travels.

DESCRIPTION OF EMBODIMENTS

Hereinafter, embodiments of a mobile object control device, a mobile object control method, and a storage medium of the present invention will be described with reference to the drawings. A mobile object control device is a device that controls a movement of a mobile object. Mobile objects include vehicles such as three- or four-wheeled vehicles, two-wheeled vehicles, micro-mobility, and the like, and may include, for example, any mobile object on which a person (an occupant) boards and which can move on a road surface on which a traveling lane is present, such as a traveling lane. In the following description, a mobile object is assumed to be a four-wheeled vehicle, and is referred to as a "host vehicle M." In the following description, the host vehicle M is mainly described as an automated driving vehicle. Automated driving means, for example, automatically executing driving control for controlling one or both of the steering and speed of the host vehicle M. The driving control of the host vehicle M includes, for example, a lane keeping assistance system (LKAS), which is driving assistance control that allows the host vehicle M to travel in without deviating from a host vehicle lane (a traveling lane) in which the host vehicle M travels. In addition, the driving control may include various types of driving assistance control such as auto lane changing (ALC) and adaptive cruise control (ACC). The driving of an automated driving vehicle may also be controlled by manual driving by an occupant (a driver). Alternatively, a drive source of the host vehicle M is, for example, an internal combustion engine such as a diesel engine or a gasoline engine, an electric motor, or a combination of these. The electric motor operates using electric power generated by a generator connected to the internal combustion engine, or electric power discharged from a secondary battery or a fuel cell.

[Overall Configuration]

Figure 1:
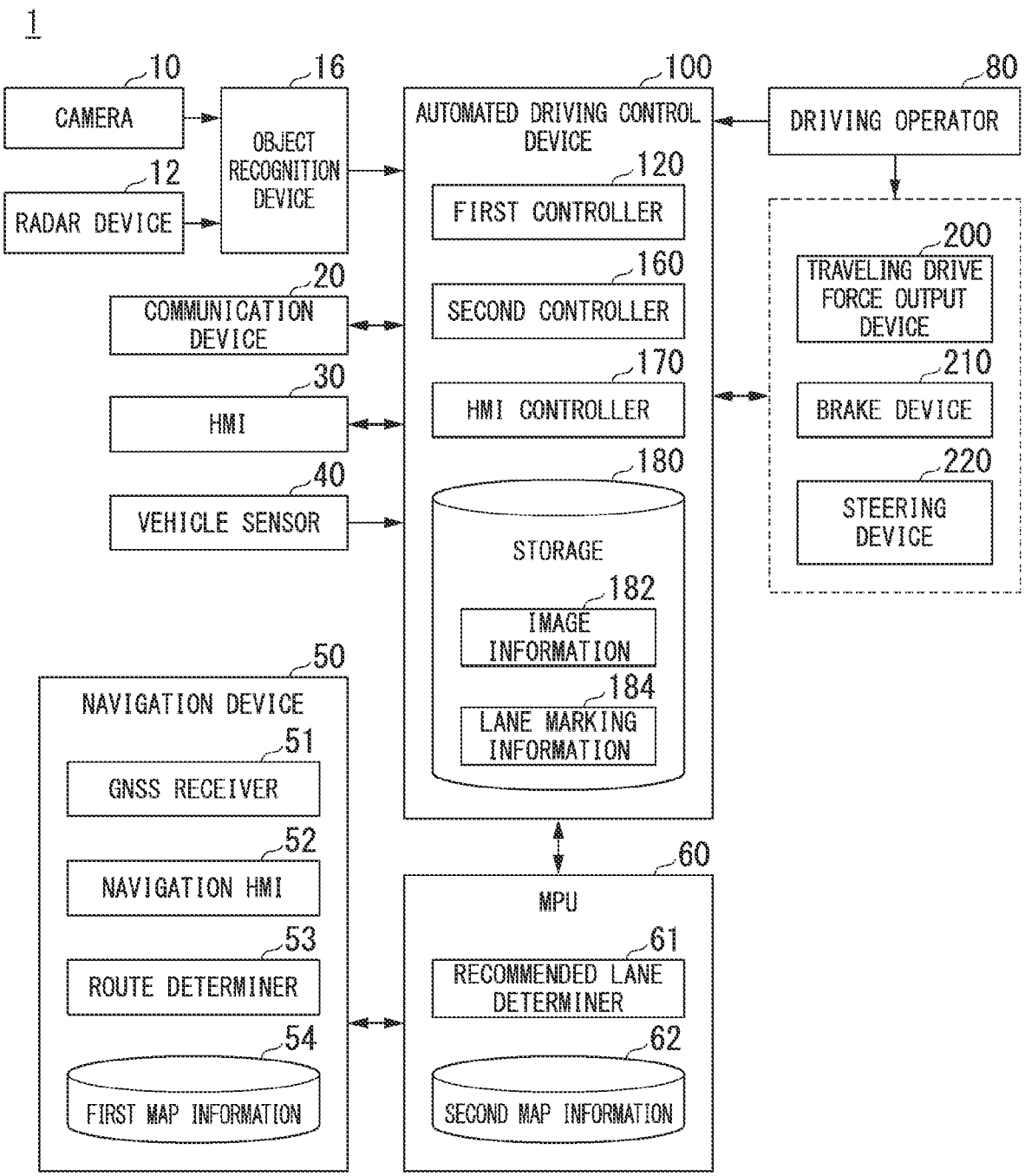
FIG. 1 is a configuration diagram of a vehicle system using a mobile object control device according to an embodiment.

FIG. 1 is a configuration diagram of a vehicle system 1 using a mobile object control device according to an embodiment. The vehicle system 1 includes, for example, a camera 10, a radar device 12, an object recognition device 16, a communication device 20, a human machine interface (HMI) 30, and a vehicle sensor 40, a navigation device 50, a map positioning unit (MPU) 60, a driving operator 80, an automated driving control device 100, a traveling drive force output device 200, a brake device 210, and a steering device 220. These devices and apparatuses are connected to each other by a multiplex communication line such as a controller area network (CAN) communication line, a serial communication line, a wireless communication network, or the like. The configuration shown in FIG. 1 is merely an example, and a part of the configuration may be omitted or another configuration may be added. The camera 10 is an example of an "imaging unit." The automated driving control device 100 is an example of a "mobile object control device."

The camera 10 is a digital camera that uses a solid-state image sensor such as a charge coupled device (CCD) or a complementary metal oxide semiconductor (CMOS). The camera 10 is attached to an arbitrary place in a host vehicle M in which the vehicle system 1 is mounted. When an image of the front is captured, the camera 10 is attached to an upper part of the front windshield, a back surface of the windshield rear-view mirror, and the like. The camera 10 periodically and repeatedly captures, for example, an image of a periphery of the host vehicle M. The camera 10 may be a stereo camera.

The radar device 12 radiates radio waves such as millimeter waves to the periphery of the host vehicle M, and also detects at least a position (a distance and an orientation) of an object by detecting radio waves (reflected waves) reflected by the object. The radar device 12 is attached to an arbitrary place on the host vehicle M. The radar device 12 may detect the position and speed of an object in a frequency modulated continuous wave (FM-CW) method.

The object recognition device 16 analyzes an image that shows a situation ahead of the host vehicle M captured by the camera 10 and extracts necessary information. Then, the object recognition device 16 performs sensor fusion processing on results of detection by the camera 10 and the radar device 12 to recognize the position, type, speed, and the like of an object and output a result of the recognition to the automated driving control device 100. The radar device 12 may be omitted in the present invention, and, in this case, the object recognition device 16 may only have a function of analyzing an image. The detection result of the radar device 12 may be directly output to the automated driving control device 100 as it is without performing sensor fusion processing. A function of the object recognition device 16 may be included in the automated driving control device 100 (more specifically, the recognizer 130 to be described below). In this case, the object recognition device 16 may be omitted from the vehicle system 1.

The communication device 20 communicates with other vehicles present in the periphery of the host vehicle M by using, for example, a cellular network, a Wi-Fi network, Bluetooth (a registered trademark), dedicated short range communication (DSRC), or the like, or communicates with various server devices via a wireless base station.

The HMI 30 outputs various types of information to an occupant of the host vehicle M under control of the HMI controller 170. The HMI 30 may function as a receiver that receives an input operation from the occupant. The HMI 30 includes, for example, a display device, a speaker, a microphone, a buzzer, a key, an indicator lamp, and the like. The display device is, for example, a liquid crystal display (LCD) or an organic electro luminescence (EL) display device.

The vehicle sensor 40 includes a vehicle speed sensor that detects a speed of the host vehicle M, an acceleration sensor that detects acceleration, a yaw rate sensor that detects an angular speed around a vertical axis, an azimuth sensor that detects a direction of the host vehicle M, and the like. The vehicle sensor 40 may include a position sensor that acquires a position of the host vehicle M. The position sensor is, for example, a sensor that acquires positional information (longitude and latitude information) from a global positioning system (UPS) device. The position sensor may be a sensor that acquires positional information using a global navigation satellite system (GNSS) receiver 51 of the navigation device 50.

The navigation device 50 includes, for example, a GNSS receiver 51, a navigation HMI 52, and a route determiner 53. The navigation device 50 holds first map information 54 in a storage device such as a hard disk drive (HDD) or a flash memory. The GNSS receiver 51 identifies the position of the host vehicle M based on a signal received from a GNSS satellite. The position of the host vehicle M may be identified or complemented by an inertial navigation system (INS) using an output of the vehicle sensor 40. The navigation HMI 52 includes a display device, a speaker, a touch panel, a key, and the like. The navigation HMI 52 may be partially or entirely shared with the HMI 30 described above. The route determiner 53 determines, for example, a route from the position of the host vehicle M (or an arbitrary position to be input) identified by the GNSS receiver 51 to a destination to be input by the occupant using the navigation HMI 52 (hereinafter, a route on a map) with reference to the first map information 54. The first map information 54 is, for example, information in which a road shape is expressed by a link indicating a road and nodes connected by a link. The first map information 54 may include a road curvature, point of interest (POI) information, and the like. A route on a map is output to the MPU 60. The navigation device 50 may perform route guidance using the navigation HMI 52 based on the route on a map. The navigation device 50 may be realized by, for example, a function of a terminal device such as a smartphone or a tablet terminal owned by the occupant. The navigation device 50 may transmit a current position and a destination to a navigation server via the communication device 20 and acquire a route equivalent to the route on a map from the navigation server.

The MPU 60 includes, for example, a recommended lane determiner 61, and holds second map information 62 in a storage device such as an HDD or a flash memory. The recommended lane determiner 61 divides the route on a map provided from the navigation device 50 into a plurality of blocks (for example, divides every 100 [m] in a vehicle traveling direction), and determines a recommended lane for each block with reference to the second map information 62. For example, the recommended lane determiner 61 determines which numbered lane from the left to drive when a lane in which a vehicle currently travels or a road on which a vehicle will travel in the near future has a plurality of lanes. When a branch place is present on the route on a map, the recommended lane determiner 61 determines a recommended lane so that the host vehicle M can travel on a reasonable route to proceed to the branch destination.

The second map information 62 is map information with higher accuracy than the first map information 54. The second map information 62 includes, for example, information on a center of a lane or information on a boundary of a lane (for example, road lane markings, road shoulders, curbs, medians, guardrails), and the like. The second map information 62 may include road information (road type), the number of lanes on a road, a presence or absence of branching or merging point, legal speed (a speed limit, maximum speed, minimum speed), traffic regulation information, address information (address, postal code), facility information, telephone number information, and the like. The second map information 62 may be updated at any time by the communication device 20 communicating with other devices.

The driving operator 80 includes, for example, a steering wheel, an accelerator pedal, a brake pedal, a shift lever, and other operators. The driving operator 80 has a sensor that detects the amount of operation or a presence or absence of an operation attached thereto, and a result of detection is output to the automated driving control device 100, or some or all of the traveling drive force output device 200, the brake device 210, and the steering device 220.

Next, before describing the automated driving control device 100, the traveling drive force output device 200, the brake device 210, and the steering device 220 will be described. The traveling drive force output device 200 outputs a traveling drive force (torque) for traveling of the host vehicle M to the drive wheels. The traveling drive force output device 200 includes, for example, a combination of an internal combustion engine, an electric motor, a transmission, and the like, and an electronic control unit (ECU) for controlling these. The ECU controls the configuration described above according to information input from the automated driving control device 100 (specifically, a second controller 160 to be described below) or information input from the driving operator 80.

The brake device 210 includes, for example, a brake caliper, a cylinder that transmits a hydraulic pressure to the brake caliper, an electric motor that generates a hydraulic pressure in the cylinder, and a brake ECU. The brake ECU controls the electric motor according to information input from the second controller 160 or information input from the driving operator 80 so that brake torque corresponding to a braking operation is output to each wheel. The brake device 210 may be provided with a mechanism of transmitting a hydraulic pressure generated by operating a brake pedal included in the driving operator 80 to the cylinder via a master cylinder as a backup. The brake device 210 is not limited to the configuration described above, and may be an electronically controlled hydraulic brake device that controls an actuator according to the information input from the second controller 160 and transmits the hydraulic pressure of the master cylinder to the cylinder.

The steering device 220 includes, for example, a steering ECU and an electric motor. The electric motor applies, for example, force to a rack and pinion mechanism to change a direction of steering wheels. The steering ECU drives the electric motor according to information input from the second controller 160 or information input from the steering wheel 82 of the driving operator 80, and changes the direction of the steering wheels.

Next, the automated driving control device 100 will be described. The automated driving control device 100 includes, for example, a first controller 120, a second controller 160, an HMI controller 170, and a storage 180. The first controller 120, the second controller 160, and the HMI controller 170 are realized by, for example, a hardware processor such as a central processing unit (CPU) executing a program (software), respectively. Some or all of these components may be realized by hardware (a circuit unit; including circuitry) such as large-scale integration (LSI), an application specific integrated circuit (ASIC), a field-programmable gate array (FPGA), or a graphics processing unit (GPU), or may be realized by software and hardware in cooperation. A program may be stored in advance in a storage device (a storage device having a non-transitory storage medium) such as an HDD or flash memory of the automated driving control device 100, or may be stored in a detachable storage medium such as a DVD or a CD-ROM and installed in the HDD or flash memory of the automated driving control device 100 by the storage medium (non-transitory storage medium) being attached to a drive device.

A combination of the action plan generator 140 and the second controller 160 is an example of a "driving controller."

The storage 180 may be implemented by the various storage devices described above, a solid-state drive (SSD), an electrically erasable programmable read only memory (EEPROM), a read only memory (ROM), or a random access memory (ROM). The storage 180 stores, for example, image information 182, lane marking information 184, information necessary for executing various types of processing in the present embodiment, programs, various other types of information, and the like. The image information 182 is information of a surrounding image of the host vehicle M captured by the camera 10 (an image including at least the traveling direction of the host vehicle M). In the following description, an image captured by the camera 10 is referred to as a "camera image." In the image information 182, an imaging time by the camera 10 and a position and a direction of the host vehicle M at the time of imaging may be associated with the camera image. The image information 182 stores a camera image taken a predetermined time ago (before a predetermined image frame). The predetermined time in this case may be a fixed time, or a variable time in accordance with the speed of the host vehicle M and a road shape. In the following description, a camera image taken a predetermined time ago is referred to as a "past camera image." A past camera image is an example of a "second image." The lane marking information 184 is information of road lane markings that demarcate lanes on a road recognized by the recognizer 130 a predetermined time ago (hereinafter simply referred to as "lane markings"). The lane marking information 184 may include, for example, positional information of a lane in which the host vehicle M travels (hereinafter referred to as a "host vehicle lane") obtained from a result of analysis of a past camera image. In this case, the storage 180 holds lane markings that demarcated the host vehicle lane in the past camera image. The storage 180 may store map information (the first map information 54 and the second map information 62).

Figure 2:
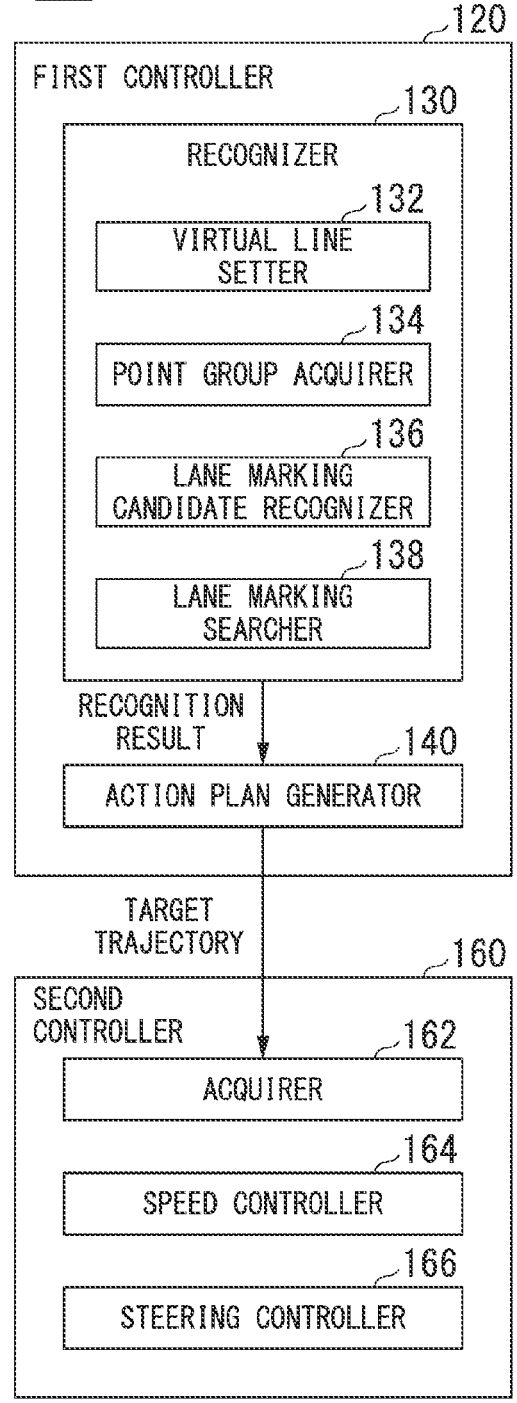
FIG. 2 is a functional configuration diagram of a first controller and a second controller.

FIG. 2 is a functional configuration diagram of the first controller 120 and the second controller 160. The first controller 120 includes, for example, a recognizer 130 and an action plan generator 140. The first controller 120 realizes, for example, a function by artificial intelligence (AI) and a function of a predetermined model in parallel. For example, a function of "recognizing an intersection" may be realized by executing both recognition of an intersection by deep learning and recognition based on a predetermined condition (a signal for pattern matching, a road sign, or the like) in parallel, and scoring and comprehensively evaluating the both. As a result, reliability of automated driving is ensured.

The recognizer 130 recognizes a state such as a position (relative position), speed (relative speed), or acceleration of an object (for example, another vehicle and other obstacles) in the surrounding of the host vehicle M on the basis of information input from the camera 10 and the radar device 12 via the object recognition device 16. The position of an object is recognized as, for example, a position on absolute coordinates (vehicle-centered coordinate system) with a representative point of the host vehicle M (a center of gravity, a center of a drive shaft, or the like) set as the origin, and used for control. The position of an object may be represented by a representative point such as the center of gravity or a corner of the object, or may be represented by an area. If the object is a mobile object such as another vehicle, the "state" of the object may also include the acceleration or jerk, or a "behavioral state" of the other vehicle (for example, whether it is changing or is about to change lanes).

The recognizer 130 recognizes, for example, a host vehicle lane on the basis of at least information input from the camera 10. Specifically, the recognizer 130 includes, for example, a virtual line setter 132, a point group acquirer 134, a lane marking candidate recognizer 136, and a lane marking searcher 138. Each function is used to recognize lane markings that demarcate a host vehicle lane, the host vehicle lane itself, boundary lines other than lane markings (for example, road boundary lines), or the like. Details of each function will be described below.

The recognizer 130 may recognize, in addition to (or instead of) recognizing the host vehicle lane through functions of a virtual line setter 132, a point group acquirer 134, a lane marking candidate recognizer 136, and a lane marking searcher 138, the lane markings that demarcate a host vehicle lane or the host vehicle lane itself by comparing a pattern of a lane marking obtained from the second map information 62 (for example, an array of solid and broken lines) with a pattern of a lane marking around the host vehicle M recognized from an image captured by the camera 10. The recognizer 130 may recognize not only lane markings but also lane boundaries (road boundaries) including shoulders, curbs, medians, guardrails, and the like. In this recognition, the position of the host vehicle M acquired from the navigation device 50 and a result of processing by an INS may also be added. In addition, the recognizer 130 recognizes stop lines, obstacles, red lights, toll booths, road signs, and other road events. The recognizer 130 may recognize adjacent lanes adjacent to the host vehicle lane and oncoming lanes facing the host vehicle lane. The adjacent lanes are, for example, lanes in which a vehicle can travel in the same direction as that of the host vehicle lane traveling lane.

The recognizer 130 may recognize the position and posture of the host vehicle M with respect to the host vehicle lane when the host vehicle lane is recognized. The recognizer 130 may recognize, for example, a deviation of a reference point of the host vehicle M from a center of the lane and an angle of the host vehicle M, which is formed with respect to a line connecting centers of the lane in the traveling direction of the host vehicle M as a relative position and a posture of the host vehicle M with respect to the host vehicle lane. Alternatively, the recognizer 130 may also use a position of the reference point of the host vehicle M with respect to either side end of the host vehicle lane (for example, lane markings or road boundaries) or the like as the relative position of the host vehicle M with respect to the traveling lane. Here, the reference point of the host vehicle M may be a center of the host vehicle M or the center of gravity of the host vehicle M. The reference point may be an end (a front end or a rear end) of the host vehicle M, or may be a position where one of wheels of the host vehicle M is present.

In principle, the action plan generator 140 travels in a recommended lane determined by the recommended lane determiner 61, and, furthermore, generates a target trajectory on which the vehicle M will automatically travel (regardless of an operation of a driver) in the future on the basis of a result of recognition by the recognizer 130 and the like so as to be able to respond to surrounding conditions of the vehicle M. The target trajectory includes, for example, a speed element. For example, the target trajectory is expressed as a sequence of points (trajectory points) to be reached by the vehicle M. The trajectory point is a point to be reached by the vehicle M for each predetermined traveling distance (for example, about several [m]) along a road, and, separately, a target speed and a target acceleration for each predetermined sampling time (for example, about decimal point number [sec]) are generated as a part of the target trajectory. The trajectory point may be a position to be reached by the vehicle M at a corresponding sampling time for each predetermined sampling time. In this case, information on the target speed and target acceleration is expressed by an interval between trajectory points. When a preset speed of the vehicle M is determined, the action plan generator 140 may generate a target trajectory such that the speed of the vehicle M becomes the set speed within a travelable range.

The action plan generator 140 may set an event of automated driving (function) when a target trajectory is generated. The event of automated driving includes a constant-speed traveling event, a low-speed following traveling event, a lane change event, a branching event, a merging event, and a takeover event. The action plan generator 140 generates a target trajectory according to an event to be started. The action plan generator 140 may propose (recommend) an execution of driving control or a predetermined event according to a driving mode of the vehicle M to be described below to an occupant when the driving control, the event, or the like is executed, and may generate a corresponding target trajectory when this proposal is approved.

The second controller 160 controls the traveling drive force output device 200, the brake device 210, and the steering device 220 so that the vehicle M passes the target trajectory generated by the action plan generator 140 at a scheduled time.

The second controller 160 includes, for example, an acquirer 162, a speed controller 164, and a steering controller 166. The acquirer 162 acquires information on a target trajectory (trajectory points) generated by the action plan generator 140 and stores it in a memory (not shown). The speed controller 164 controls the traveling drive force output device 200 or the brake device 210 based on a speed element associated with the target trajectory stored in the memory. The steering controller 166 controls the steering device 220 according to a degree of bending of the target trajectory stored in the memory. Processing of the speed controller 164 and the steering controller 166 is realized by, for example, a combination of feedforward control and feedback control. As an example, the steering controller 166 executes the combination of feedforward control according to a curvature of a road in front of the vehicle M and feedback control based on a deviation from the target trajectory in combination.

The HMI controller 170 notifies the occupant (driver) of the host vehicle M of predetermined information using the HMI 30. The predetermined information includes, for example, driving assistance information. For example, the HMI controller 170 may generate an image containing the predetermined information described above, display the generated image on a display device of the HMI 30, generate a sound indicating the predetermined information, and output the generated sound from a speaker of the HMI 30. The HMI controller 170 may also output, for example, information received by the HMI 30 to the communication device 20, the navigation device 50, the first controller 120, and the like.

[Virtual Line Setter, Point Group Acquirer, Lane Marking Candidate Recognizer, and Lane Marking Searcher]

Figure 3:
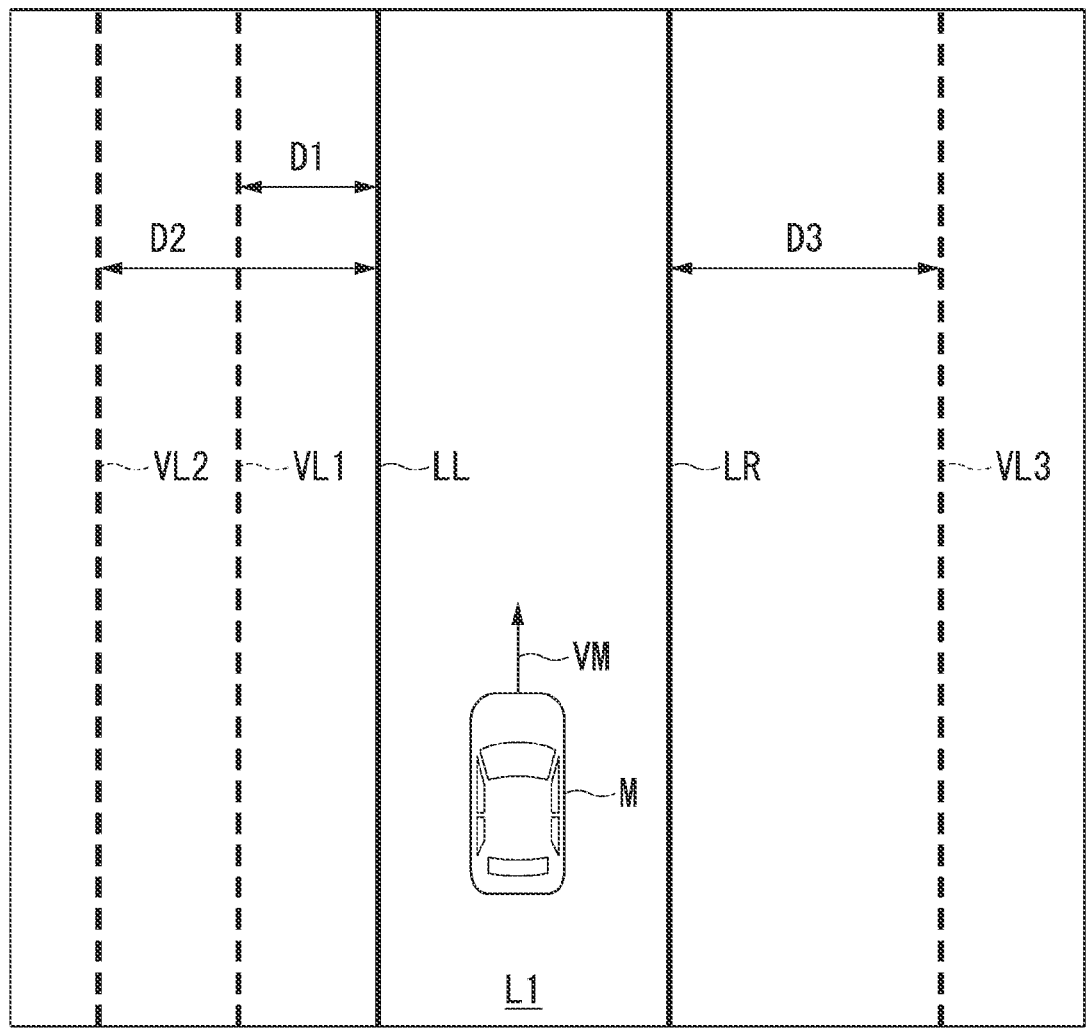
FIG. 3 is a diagram for describing a function of a virtual line setter.

Details of the functions of the virtual line setter 132, the point group acquirer 134, the lane marking candidate recognizer 136, and the lane marking searcher 138 will be described below. The virtual line setter 132 sets a virtual line based on the position of a lane marking recognized in the past as the lane marking that demarcates the traveling lane of the host vehicle M, which is included in the lane marking information 184 stored in the storage 180. FIG. 3 is a diagram for describing the function of the virtual line setter 132. As shown in the example of FIG. 3, it is assumed that the host vehicle M is traveling in an X-axis direction at a speed VM. Lane markings LL and LR are lane markings determined as lane markings that demarcate a traveling lane L1 of the host vehicle M on the basis of a past camera image (a second image) by the lane marking searcher 138.

For example, on a road that includes a traveling lane (hereinafter referred to as a host vehicle lane) in which the host vehicle M travels, in addition to lane markings that demarcate the host vehicle lane, other lanes that can travel in the same direction as the host vehicle lane, lane markings that demarcate oncoming lanes in which oncoming vehicles travel, road shoulders, curbs, sidewalks, and the like are present. Since these extend along the host vehicle lane in many cases, line segments extracted by image analysis may be recognized as lane markings of the host vehicle lane. Therefore, the virtual line setter 132 sets, based on positions of past lane markings, a virtual line at a position where a linear or non-linear line segment is expected to be extracted according to lane markings that demarcate lanes other than the host vehicle lane, and edge portions of road boundaries such as road shoulders, curbs, sidewalks, and the like from a camera image. For example, the virtual line setter 132 uses the lane markings of the host vehicle lane recognized from a past camera image as a reference, and sets one or more virtual lines at positions that are a predetermined distance away from the lane markings outside (distantly) the lane markings when viewed from the host vehicle M. When a plurality of virtual lines are set, they may be set at predetermined intervals.

The predetermined distance described above may be, for example, a fixed distance, and may be a distance associated with a position where a road boundary line such as a lane marking other than those for the host vehicle lane or a road shoulder is present as seen by referring to map information (the first map information 54, the second map information 62) on the basis of the positional information of the host vehicle M obtained from the vehicle sensor 40, and acquiring road information around the host vehicle M. The predetermined distance may be the same length as a lane width of the host vehicle lane L1. As a result, a virtual line can be set at a position with a high possibility of a lane marking that demarcates an oncoming lane or an adjacent lane being present. The number of virtual lines may be a fixed number, or may be variably set according to the shape of a road (for example, the number of lanes of a road on which the host vehicle M travels, the presence or absence of sidewalks, or the like obtained from map information). The number of virtual lines may be set differently for each of the left and right lane markings LL and LR of the host vehicle lane L1.

In the example of FIG. 3, using the left lane marking LL that demarcates the host vehicle lane L1 as a reference, a virtual line VL1 is set at a position that is a distance D1 away from the lane marking LL when viewed from the host vehicle M, and a virtual line VL2 is set at a position that is a distance D2, which is longer than the distance D1, away. In the example of FIG. 3, using the right lane marking LR that demarcates the host vehicle lane L1 as a reference, a virtual line VL3 is set at a position that is a distance D3 away from the lane marking LR when viewed from the host vehicle M.

The point group acquirer 134 acquires a current camera image (an image representing a situation ahead of the host vehicle M) from the camera 10, and acquires a point group of an object included in the acquired camera image. The current camera image is an example of a "first image." For example, the point group acquirer 134 extracts edge points from the camera image (the first image) by existing image analysis processing, and collectively acquires points within a predetermined interval among the extracted edge points as the point group of the object. The point group acquired at this time is, for example, a point group defined in an image obtained by converting the camera image into a two-dimensional coordinate system (overhead coordinate system) in which the host vehicle M is viewed from above. A reference position (origin) of the two-dimensional coordinates in this case is, for example, the representative point of the host vehicle M. The point group acquirer 134 may store the camera image acquired from the camera 10 as the image information 182 in the storage 180.

The lane marking candidate recognizer 136 forms a point sequence from point groups arranged at intervals within a predetermined distance in the same direction (including the allowable angle range) among point groups acquired by the point group acquirer 134, and compares the formed point sequence with a predetermined point sequence pattern to recognize candidates for a lane marking. For example, when a point sequence is linearly and extends a predetermined distance or more, or when a point sequence is non-linear but extends a predetermined distance or more with a predetermined curvature, the lane marking candidate recognizer 136 recognizes this point sequence as a lane marking candidate.

The lane marking candidate recognizer 136 acquires the candidates for a lane marking at a current point by inputting, for example, point group data acquired by the point group acquirer 134 to a learned model such as a deep neural network (DNN) learned such that the point group data is input and the candidates for a lane marking corresponding to the point group data are output. The lane marking candidate recognizer 136 may acquire the candidates for a lane marking at a current point by inputting a camera image to the learned model such as a DNN learned such that the camera image is input and the candidates for a lane marking corresponding to the image are output. In this case, the point group acquirer 134 may be omitted from the recognizer 130. The learned model described above may be stored in the storage 180 or acquired from an external device through communication via the communication device 20.

Figure 4:
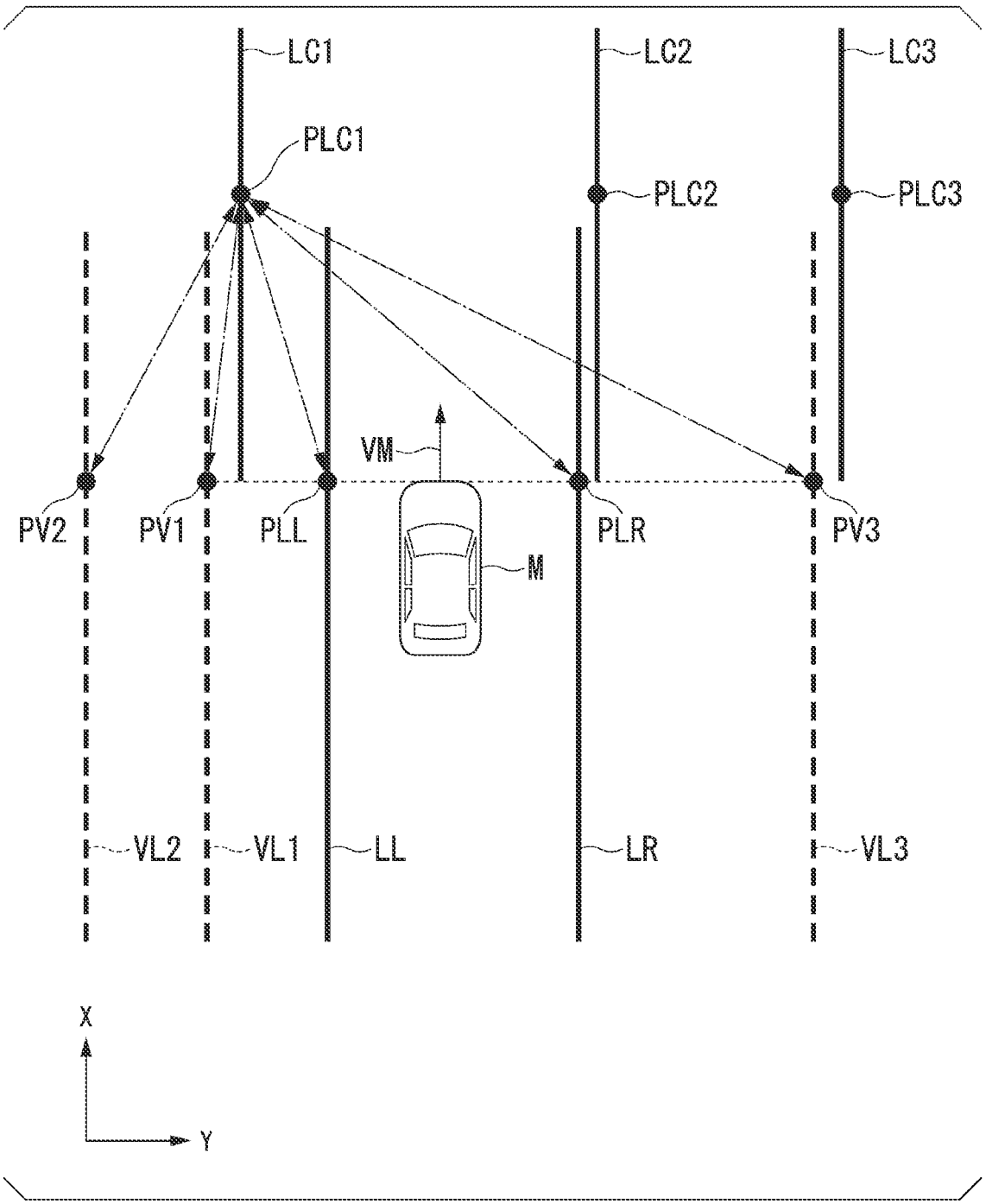
FIG. 4 is a diagram for describing an example of a function of a lane marking searcher.

The lane marking searcher 138 determines a lane marking that demarcates the host vehicle lane among the lane marking candidates recognized by the lane marking candidate recognizer 136. FIG. 4 is a diagram for describing an example of the function of the lane marking searcher 138. In the example of FIG. 4, the left and right lane markings LL and LR (past lane markings) of the host vehicle lane L1 recognized from a camera image (a second image) taken in the past (a predetermined time ago), the virtual lines VL1 to VL3 set by the virtual line setter 132, and the lane marking candidates LC1 to LC3 recognized by the lane marking candidate recognizer 136 based on a current camera image (a first image) are shown. A second image obtained by acquiring the lane markings LL and LR and the virtual lines VL1 to VL3 is a past camera image, and was taken at a different time from a first image that is obtained by recognizing the lane marking candidates LC1 to LC3 by the lane marking candidate recognizer 136. For this reason, the lane marking searcher 138 converts the first image and the second image into two-dimensional images of the host vehicle M viewed from above, and superimposes each image on a two-dimensional coordinate system (host vehicle-centered coordinate system) based on the position of the host vehicle M to acquire a positional relationship between the lane markings LL and LR and the virtual lines VL1 to VL3 as shown in FIG. 4 and the lane marking candidates LC1 to LC3. The lane marking searcher 138 may correct the positions and shapes of the lane markings LL and LR and the virtual lines VL1 to VL3 or the positions and shapes of the lane marking candidates LC1 to LC3 acquired from the second image on the basis of one or both of a movement amount and a movement direction of the host vehicle M from when the first image is captured by the camera 10 to when the second image is captured, and the shape of a road.

For example, when the host vehicle M has been turning and traveling since a past camera image was taken, the lane marking searcher 138 performs positioning on the current camera image (first image) and the past camera image (second image) such that directions (movement directions) of the host vehicle are the same, and corrects the positions of the lane markings LL and LR and the virtual lines VL1 to VL3 obtained from the second image corresponding to the direction. When an inclination angle and a curvature of a road have changed since the past camera image of the host vehicle M was captured, the positions of the lane markings LL and LR and the virtual lines VL1 to VL3 are corrected according to the inclination angle and the curvature. As a result, a positional relationship between the lane markings LL and LR and the virtual lines VL1 to VL3 and the lane marking candidates LC1 to LC3 can be acquired more accurately.

The lane marking searcher 138 searches for a line closest to each of the lane marking candidates LC1 to LC3 (for example, a nearest lane marking or virtual line) based on the positional relationship between the lane markings LL and LR and the virtual lines VL1 to VL3 shown in FIG. 4 and the lane marking candidates LC1 to LC3. "Closest" means, for example, that the distance is the shortest. In addition to (or instead of) the distance, at least one of an inclination of the line with respect to the traveling direction of the host vehicle, a shape of the line in a predetermined section, a thickness of the line, a color of the line, a type of the line, and the like which are the closest may be included. In the following description, an example of searching for a line closest to the lane marking candidate LC1 among lines of the lane markings LL and LR and the virtual lines VL1 to VL3 will be described.

For example, the lane marking searcher 138 cuts out sections between a reference point PLC1 on the lane marking candidate LC1 that is present at a first predetermined distance from the position (for example, a representative point) of the host vehicle M, and reference points PLL and PLR on the lane markings LL and LR that are present at predetermined positions based on the position of the host vehicle M and reference points PV1 to PV3 of each of the virtual lines VL1 to VL3, and derives distances in the cut sections. The first predetermined distance is, for example, a value determined on the basis of camera information (parameter information of the camera 10). The parameter information includes, for example, an angle of view and a photographing distance (a limit distance). For example, by setting the reference point PLC1 within a range not exceeding at least the photographing distance on the basis of the camera information, recognition errors can be suppressed and more accurate line comparison can be performed. The first predetermined distance may be, for example, a longest distance (a farthest position from the host vehicle M) at which predetermined positions PLL and PLR present in a road width direction and the virtual lines VL1 to VL3 are recognized to be present according to the camera image, and may also be a fixed distance (a first fixed distance). The reference points PLL, PLR, and PV1 to PV3 are, for example, points corresponding to the representative points of the host vehicle M (for example, a front end of the host vehicle), in a lateral position direction, but other points may also be used as a reference. In the following description, derivation of a distance between the lane marking candidate LC1 and the virtual line VL1 in the cut-out section will be described, but the same processing is performed to derive distances between the lane marking candidate LC1 and each of the lane markings LL and LR and the virtual lines VL2 and VL3.

Figure 5:
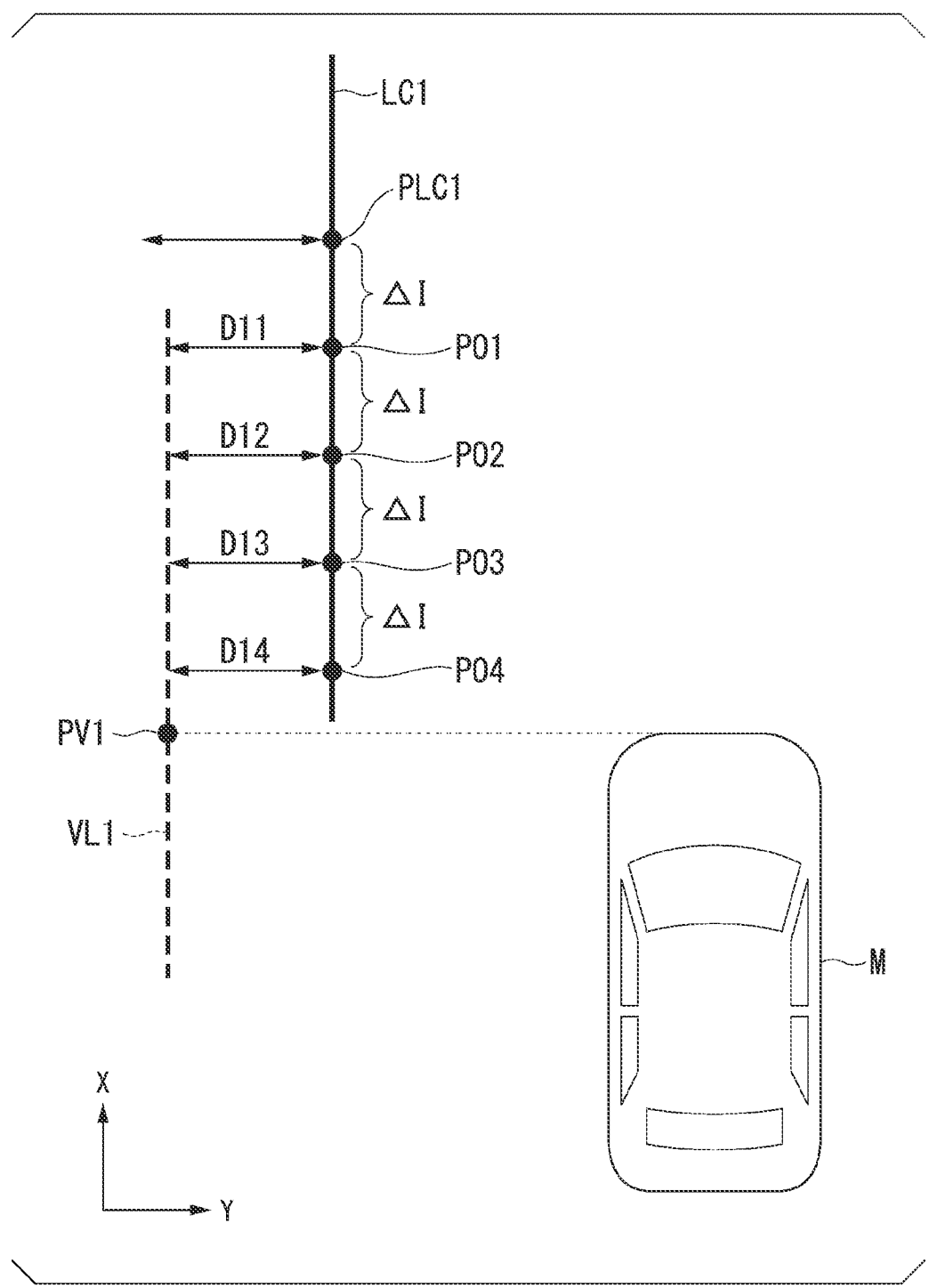
FIG. 5 is a diagram for describing a distance derivation between a lane marking candidate and a virtual line.

FIG. 5 is a diagram for describing the derivation of the distance between the lane marking candidate LC1 and the virtual line VL1. In the example of FIG. 5, the lane marking searcher 138 uses the reference point PLC1 of the lane marking candidate LC1 as a starting point for searching, sets a predetermined number of points shifted from the reference point PLC1 by a predetermined interval AI in a direction in which the reference point PV1 of the virtual line VL1 is present on the lane marking candidate LC1, and derives each distance from each of the set points to a point where the line extending in a horizontal direction (a Y-axis direction) of the image (or a line extending in a direction perpendicular to an extending direction of the lane marking candidate LC1) is in contact with the virtual line VL1. The predetermined interval AI may be, for example, a predetermined fixed interval or a variable interval based on the speed of the host vehicle M detected by the vehicle sensor 40, the shape of a road, and the like. The predetermined number may be, for example, a predetermined fixed number, or may be a variable number based on the speed of the host vehicle M, the shape of a road, and the like. In the example of FIG. 5, four searching points PO1 to PO4 are set. The lane marking searcher 138 derives the distance at each point on the basis of a difference between each point of the reference point PLC1 and the searching points PO1 to PO4 and the virtual line VL1 in the horizontal direction of the image. In the example of FIG. 5, since the virtual line VL1 is not present in the horizontal direction of the reference point PLC1, a distance from this point is not derived, and distances D11 to D14 corresponding to the searching points PO1 to PO4 are derived. Then, the lane marking searcher 138 derives a distance between the virtual line VL1 and the lane marking candidate LC1 on the basis of the respective distances D11 to D14. The distance is derived by, for example, calculating a mean square value of each of the distances D11 to D14. The distance may also be derived by adding or averaging the distances D11 to D14, or by substituting values of the distances D11 to D14 into a predetermined function. The distance may be a distance on an image (a vehicle-centered coordinate system image) converted into a view of the host vehicle M from above, or may be an actual distance adjusted on the basis of photographing information of the camera image.

The lane marking searcher 138 also derives distances from the lane marking candidate LC1 to other virtual lines VL2 and VL3 and the lane markings LL and LR. Then, the lane marking searcher 138 derives a closest lane marking. For example, when a line closest to the lane marking candidate LC1 is the past lane marking LL or LR, the lane marking searcher 138 determines that the lane marking candidate LC1 is a lane marking of the host vehicle lane L1. The lane marking searcher 138 may determine that the lane marking candidate LC1 is not the lane marking that demarcates the host vehicle lane L1 (or the lane marking candidate LC1 is a boundary line other than the lane marking that demarcates the traveling lane) when the line closest to the lane marking candidate LC1 is one of the virtual lines VL1 to VL3. By determining a lane marking candidate that is not the lane marking of traveling lane L1, it is possible to extract the lane marking of the current host vehicle lane more accurately.

When the lane marking searcher 138 determines that the lane marking candidate LC1 is a boundary line other than the lane marking that demarcates the traveling lane, while the lane marking candidate LC1 is recognized by the lane marking candidate recognizer 136, it may be excluded from the processing of searching for the lane marking of the host vehicle lane L1. As a result, a processing load for determining the lane marking of the host vehicle lane L1 can be reduced.

When a distance from the closest line of the lane marking candidate LC1 is equal to or greater than a threshold among the lane markings LL and LR and the virtual lines VL1 to VL3, the lane marking searcher 138 may not determine the line as the lane marking. In this case, the lane marking searcher 138 continues to use lane markings of the past host vehicle lane searched in the past as lane markings that demarcate the current host vehicle lane. As a result, even if the lane marking candidate cannot be temporarily recognized from the camera image due to surrounding environment of the host vehicle M or the state of a lane marking drawn on a road surface, it is possible to continue driving assistance such as LKAS on the basis of the positions of the lane markings of the traveling lane, which is a result of past (for example, immediately preceding) searching. When one of the past lane markings LL and LR cannot be searched from the lane markings LL and LR and the virtual lines VL1 to VL3, the lane marking searcher 138 may also output only positional information of the searched other lane marking. As a result, it is possible to allow the host vehicle M to travel on the basis of the information of one of the lane markings obtained as a result of searching.

In the example of FIG. 4, a line closest to the lane marking candidate LC1 is the virtual line VL1, a line closest to the lane marking candidate LC2 is the lane marking LR, and a line closest to the lane marking candidate LC3 is the virtual line VL3. Therefore, the lane marking searcher 138 determines that the lane marking candidate LC2 is the right lane marking LR with respect to the traveling direction of the traveling lane L1, and that the lane marking candidates LC1 and LC3 are not lane markings of the traveling lane L1.

In the example described above, the lane marking searcher 138 has set each point for deriving the distance from the reference point PLC1 of the lane marking candidate LC1 toward the reference point PV1 side (in other words, a front side of the host vehicle M) at predetermined intervals, but it may also set a predetermined number of points at predetermined intervals AI on the virtual line VL1 from the reference point PV1 serving as a start point toward the reference point PLC1. The lane marking searcher 138 may set the predetermined interval AI such that a predetermined number of points can be extracted from the reference point PLC1.

The lane marking searcher 138 may extend the lane marking candidates LC1 to LC3, the lane markings LL and LR, and the virtual lines VL1 to VL3 in the extension direction such that the distances from a predetermined number of searching points can be derived when the lane markings LL and LR and the virtual lines VL1 to VL3 are not present in the horizontal direction of the lane marking candidate, or when lengths of the lane marking LL and virtual lines VL1 to VL3 are short. By setting a predetermined number of searching points, it is possible to more accurately derive closeness between lines including the shape in a predetermined section instead of the distance of only one point.

The lane marking searcher 138 stores information on the lane marking of the host vehicle lane obtained by a searching this time (for example, positional information of the lane marking based on the position of the host vehicle M) and information on the host vehicle lane itself demarcated by the lane markings in the lane marking information 184 of the storage 180, and uses it at the time of a next searching for the lane marking that demarcates the host vehicle lane.

The recognizer 130 outputs a result of recognition including lane marking information of the traveling lane determined by the lane marking searcher 138 to the action plan generator 140. On the basis of the recognition result, the action plan generator 140 generates a target trajectory of the host vehicle M such that the host vehicle M travels toward a destination set by the navigation device 50, and executes driving control such that the host vehicle M travels along the generated target trajectory.

[Processing Flow]

Figure 6:
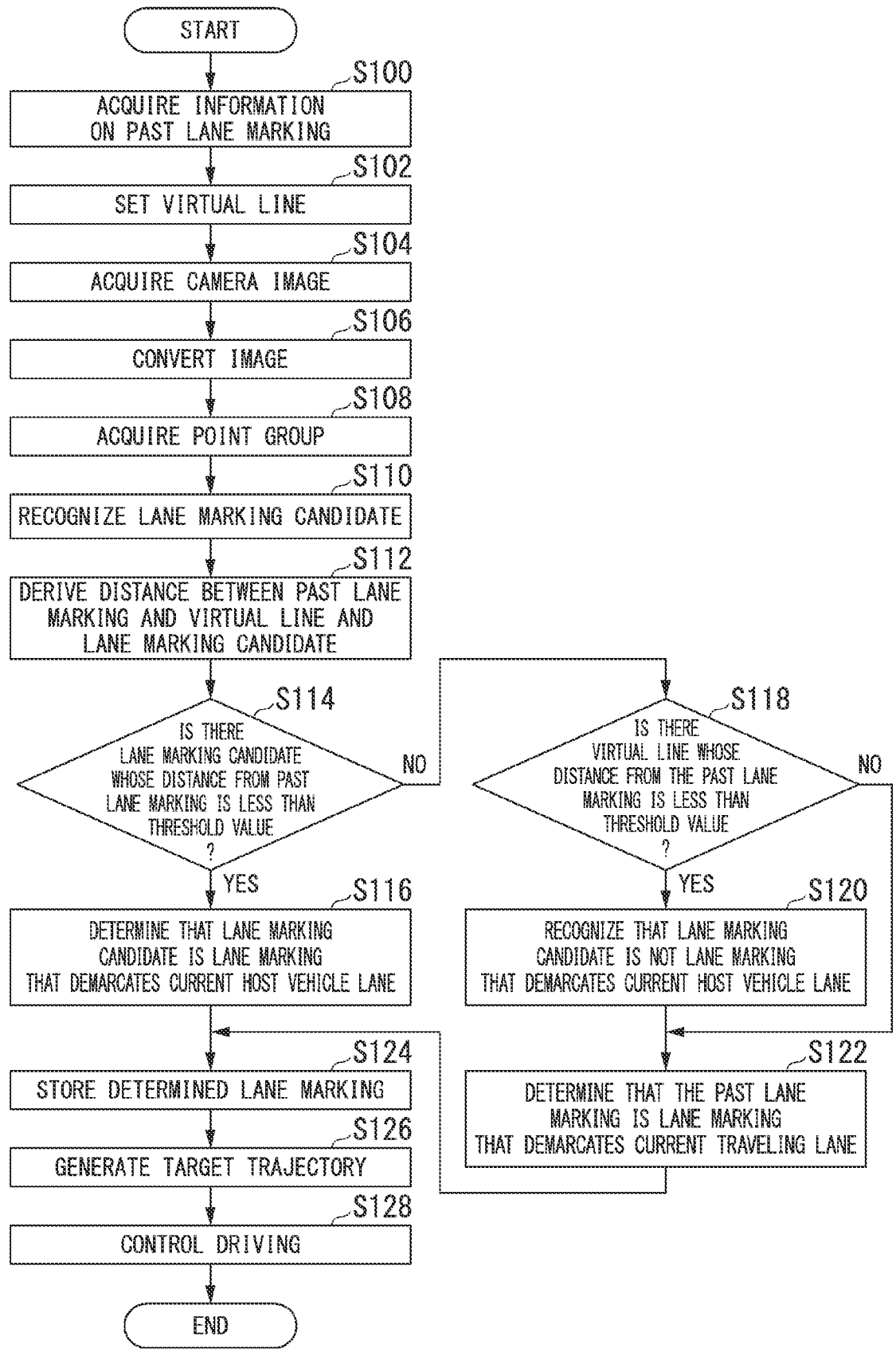
FIG. 6 is a flowchart which shows an example of a flow of processing executed by an automated driving control device of the embodiment.

FIG. 6 is a flowchart which shows an example of a flow of processing executed by the automated driving control device 100 of the embodiment. In the following, among processing executed by the automated driving control device 100, processing of searching for lane markings that demarcate the traveling lane of the host vehicle M and executing driving control of the host vehicle M on the basis of information on lane markings or the like obtained as a result of the searching will be mainly described. The processing of FIG. 6 may be repeatedly executed at predetermined intervals while the driving control of the host vehicle M is performed.

In the example of FIG. 6, the virtual line setter 132 acquires information on past lane markings from the storage 180 or the like (step S100), and sets one or more virtual lines based on positions of the past lane markings on the basis of the acquired information (step S102).

Next, the point group acquirer 134 acquires a camera image including a current front of the host vehicle M captured by the camera 10 (step S104), and converts the acquired camera image into an image of the host vehicle M viewed from above (step S106). Next, the point group acquirer 134 analyzes an image converted into coordinates, and acquires point group data (step S108). Next, the lane marking candidate recognizer 136 recognizes the candidates for a lane marking that demarcates the host vehicle lane on the basis of the point group data acquired by the point group acquirer 134 (step S110).

Next, the lane marking searcher 138 derives a distance between the past lane marking and the virtual line and the lane marking candidate (step S112). Next, the lane marking searcher 138 determines whether there is a lane marking candidate whose distance from the past lane marking is less than a threshold (step S114). When it is determined that there is a lane marking candidate whose distance from the past lane marking is less than the threshold, the lane marking searcher 138 determines the lane marking candidate as the lane marking that demarcates a current host vehicle lane (step S116).

In the processing of step S114, when it is determined that there is no lane marking candidate whose distance from the past lane marking is less than the threshold, the lane marking searcher 138 determines whether there is a virtual line whose distance from the past lane marking is less than the threshold (step S118). When it is determined that there is a virtual line whose distance from the past lane marking is less than the threshold, the lane marking searcher 138 recognizes that the lane marking candidate is not the lane marking that demarcates a current host vehicle lane (step S120).

When it is determined that there is no virtual line whose distance from the past lane marking is less than the threshold after the processing of step S120 or in the processing of step S118, the lane marking searcher 138 continues to use information of a lane marking recognized in the past, and determines the past lane marking as a lane marking that demarcates a current host vehicle lane (step S122).

After the processing of step S116 or step S122, the lane marking searcher 138 stores information on the determined lane marking in the storage 180 (step S124). In the processing of step 124, information on the lane marking candidate recognized as not a lane marking that demarcates a host vehicle lane may also be stored.

Next, the action plan generator 140 generates a target trajectory for the host vehicle M to travel in a center of a host vehicle lane along the host vehicle lane demarcated by the determined lane marking (step S126). Next, the second controller 160 executes driving control of controlling one or both of the speed and steering such that the host vehicle M travels along the target trajectory (step S128). As a result, processing of this flowchart ends.

MODIFIED EXAMPLE

The vehicle system 1 described above may be provided with light detection and ranging (LIDAR). LIDAR emits light (or electromagnetic waves having a wavelength close to light) to the surrounding of the host vehicle M and measures scattered light. The LIDAR detects a distance to an object on the basis of a time from light emission to light reception. The emitted light is, for example, pulsed laser light. The LIDAR is attached to an arbitrary place of the host vehicle M. For example, the object recognition device 16 may receive an input from LIDER, in addition to the camera 10 and the radar device 12, and recognize surrounding objects (including lane markings) from a result of sensor fusion processing based on information input from each).

In the embodiment described above, when a destination is not set by the navigation device 50 and the host vehicle M is traveling by an operation of a driver, driving control may be performed to assist driving of a part of the steering and speed of the host vehicle M using information on the lane marking of the host vehicle lane searched by the lane marking searcher 138 described above.

The lane marking searcher 138 may derive, when a line closest to a lane marking candidate is searched based on the past lane markings and virtual lines, for example, the closest line (for example, a best matching line) using an existing matching algorithm. The lane marking information 184 may store information on the virtual line set by the virtual line setter 132 in association with the information on past lane markings. The information on past lane markings (lane markings previously searched) used by the lane marking searcher 138 at the time of searching may be acquired from an image stored in the image information 182 instead of the lane marking information 184.

According to the embodiment described above, an automated driving control device (an example of the mobile object control device) includes the lane marking candidate recognizer 136 that recognizes the candidates for a lane marking that demarcates a traveling lane in which the host vehicle M is traveling from an image including the surroundings of the host vehicle (an example of the mobile object) M captured by a camera (an example of the imaging unit), the virtual line setter 132 that sets at least one or more virtual lines outside the lane marking recognized in the past as a lane marking that demarcates the traveling lane, when viewed from the host vehicle M, and the lane marking searcher 138 that searches for a lane marking that demarcates a current traveling lane of the host vehicle M on the basis of a lane marking candidate recognized by the lane marking candidate recognizer 136, one or more virtual lines, thereby more accurately recognizing the lane marking that demarcates the traveling lane in which the host vehicle is traveling.

Specifically, according to the embodiment described above, it is possible to suppress erroneous recognition of lane markings other than the lane markings of the host vehicle lane as the lane markings of the host vehicle lane by searching for a lane marking on an assumption that there are line segments other than the host vehicle lane outside the lane markings of the host vehicle lane. According to the embodiment described above, road boundaries other than the lane markings that demarcate the host vehicle lane can also be grasped. By causing the host vehicle M to travel or assist in driving based on the left and right lane markings of the host vehicle M obtained in the searching processing in the present embodiment, more robust driving control can be executed. According to the embodiment described above, since boundary lines can be searched in a wide searching range by increasing the number of virtual lines, the present embodiment can be applied even to determination of the number of lanes on a road on which the host vehicle M travels, and the like.

The embodiment described above can be expressed as follows.

A mobile object control device is configured to include a storage device that has stored a program, and a hardware processor, in which the hardware processor executes the program stored in the storage device, thereby recognizing candidates for a lane marking that demarcates a traveling lane in which a mobile object travels from an image including surroundings of the mobile object captured by an imaging unit, setting at least one or more of virtual lines outside of a lane marking recognized in the past as a lane marking that demarcates the traveling lane, when viewed from the mobile object, and searching for a lane marking that demarcates a current traveling lane of the mobile object on the basis of the recognized lane marking candidates and the set one or more virtual lines.

Although a mode for carrying out the present invention has been described above using the embodiment, the present invention is not limited to the embodiment, and various modifications and substitutions can be made within a range not departing from the gist of the present invention.

What is claimed is:

1. A mobile object control device comprising:
a lane marking candidate recognizer configured to recognize candidates for a lane marking that demarcates a traveling lane in which a mobile object travels from an image including surroundings of the mobile object captured by an imaging unit;
a virtual line setter configured to set at least one or more virtual lines outside of the lane marking recognized in the past as a lane marking that demarcates the traveling lane, when viewed from the mobile object; and
a lane marking searcher configured to search for a lane marking that demarcates a current traveling lane of the mobile object on the basis of the lane marking candidates recognized by the lane marking candidate recognizer and the one or more virtual lines.

2. The mobile object control device according to claim 1, wherein the virtual line setter sets the virtual line to a position where a road boundary including the current traveling lane of the mobile object is expected to be present.

3. The mobile object control device according to claim 1, wherein the virtual line setter sets a virtual line at a position that is a predetermined distance away from a lane marking recognized in the past as a lane marking that demarcates the traveling lane.

4. The mobile object control device according to claim 1, wherein the lane marking searcher determines, among the lane marking candidates, a lane marking candidate that is closest to the lane marking which demarcated the traveling lane in the past as a lane marking that demarcates a current traveling lane of the mobile object.

5. The mobile object control device according to claim 1, wherein the lane marking searcher does not determine, among the lane marking candidates, a lane marking candidate whose distance from the virtual line is within a predetermined distance as a lane marking that demarcates a current traveling lane of the mobile object.

6. The mobile object control device according to claim 1, wherein the lane marking searcher recognizes, among the lane marking candidates, a lane marking candidate whose distance from the virtual line is within a predetermined distance as a boundary line other than a lane marking that demarcates a current traveling lane of the mobile object.

7. The mobile object control device according to claim 1, further comprising:
a driving controller configured to control one or both of speed and steering of the mobile object such that the mobile object travels along the lane marking that demarcates a traveling lane of the mobile object, which is determined by the lane marking searcher.

8. A mobile object control method comprising:
by a computer of a mobile object control device,
recognizing candidates for a lane marking that demarcates a traveling lane in which a mobile object travels from an image including surroundings of the mobile object captured by an imaging unit;
setting at least one or more of virtual lines outside of a lane marking recognized in the past as a lane marking that demarcates the traveling lane, when viewed from the mobile object; and
searching for a lane marking that demarcates a current traveling lane of the mobile object on the basis of the recognized lane marking candidates and the set one or more virtual lines.

9. A computer-readable non-transitory storage medium that has stored a program causing a computer of a mobile object control device to execute:
recognizing candidates for a lane marking that demarcates a traveling lane in which a mobile object travels from an image including surroundings of the mobile object captured by an imaging unit;

setting at least one or more of virtual lines outside of a lane marking recognized in the past as a lane marking that demarcates the traveling lane, when viewed from the mobile object; and searching for a lane marking that demarcates a current traveling lane of the mobile object on the basis of the recognized lane marking candidates and the set one or more virtual lines.

* * * * *